(12) United States Patent
Ehrmantraut et al.

(10) Patent No.: US 7,712,701 B1
(45) Date of Patent: May 11, 2010

(54) UNMANNED AERIAL VEHICLE WITH ELECTRICALLY POWERED, COUNTERROTATING DUCTED ROTORS

(75) Inventors: Adam S. Ehrmantraut, Eagan, MN (US); Andrew M. Maust, Burnsville, MN (US); Peter K. Johnson, Mendota Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1001 days.

(21) Appl. No.: 11/351,775

(22) Filed: Feb. 10, 2006

(51) Int. Cl.
*B64C 29/00* (2006.01)
*B64C 27/10* (2006.01)
(52) U.S. Cl. .................... 244/23 C; 244/17.23
(58) Field of Classification Search ............... 244/12.2, 244/23 C, 17.23, 17.11, 23 R, 12.1, 120
See application file for complete search history.

(56) References Cited

U.S. PATENT DOCUMENTS

| | | | | |
|---|---|---|---|---|
| 1,541,976 | A | * | 6/1925 | Longren .................... 244/120 |
| 3,135,481 | A | * | 6/1964 | Sudrow .................... 244/23 C |
| 3,722,830 | A | * | 3/1973 | Barber .................... 244/17.23 |
| 4,955,560 | A | * | 9/1990 | Nishina et al. ............ 244/53 R |
| 5,150,857 | A | | 9/1992 | Moffitt et al. |
| 5,152,478 | A | * | 10/1992 | Cycon et al. ............... 244/12.2 |
| 5,277,380 | A | | 1/1994 | Cycon et al. |
| 5,419,513 | A | * | 5/1995 | Flemming et al. .......... 244/12.2 |
| 5,575,438 | A | | 11/1996 | McGonigle et al. |
| 6,070,831 | A | * | 6/2000 | Vassiliev et al. ............ 244/120 |
| 6,270,038 | B1 | | 8/2001 | Cycon et al. |
| 6,450,445 | B1 | | 9/2002 | Moller |
| 6,592,071 | B2 | | 7/2003 | Kinkead et al. |
| 6,672,538 | B2 | | 1/2004 | Millea et al. |
| 6,691,949 | B2 | | 2/2004 | Plump et al. |
| 6,694,228 | B2 | | 2/2004 | Rios |
| 6,758,436 | B2 | * | 7/2004 | Rehkemper et al. ...... 244/17.11 |
| 6,840,480 | B2 | * | 1/2005 | Carroll .................... 244/120 |
| 2004/0129833 | A1 | | 7/2004 | Perlo et al. |
| 2005/0061910 | A1 | * | 3/2005 | Wobben .................. 244/17.23 |
| 2005/0082421 | A1 | | 4/2005 | Perlo et al. |

OTHER PUBLICATIONS

"Handheld Spy Chopper." Popular Science, Sep. 2008, pp. 62-63.
Information on Competitors UAV's.

* cited by examiner

*Primary Examiner*—Tien Dinh
(74) *Attorney, Agent, or Firm*—Hamre, Schumann, Mueller & Larson, P.C.

(57) ABSTRACT

An unmanned aerial vehicle having counterrotating ducted rotors that are driven by electric motors. The vehicle has a low weight and a small profile. The unmanned aerial vehicle is suitable for a number of different tasks, including control, surveillance and reconnaissance, communication, and other tasks without exposing personnel to dangerous situations. The vehicle is particularly suited for entering buildings and other enclosed structures and spaces such as caves. The unmanned aerial vehicle can also be equipped for potential offensive actions.

19 Claims, 10 Drawing Sheets

UNMANNED AERIAL VEHICLE WITH ELECTRICALLY POWERED, COUNTERROTATING DUCTED ROTORS

FIELD

The disclosure relates to an unmanned aerial vehicle, in particular an aerial vehicle having counterrotating ducted rotors that are driven by electric motors and which has a low weight and a small profile.

BACKGROUND

In many military and law enforcement situations, it is desirable to perform control, surveillance and reconnaissance, communication, and other tasks without exposing personnel to dangerous situations.

For example, it is often necessary for military and law enforcement personnel to enter buildings and other enclosed structures and spaces. Entry into structures is done for various reasons, including searching the interiors of the structures, surveillance and reconnaissance, and apprehending individuals within the structures.

For military and law enforcements personnel, entry into structures can be extremely dangerous. Often, the personnel may not know whether there are potentially dangerous or potentially friendly occupants within a structure, how many occupants there are, or where the occupants are located within the structure. In addition, the personnel may not know the interior configuration of the structure or the location of potentially dangerous obstacles. As a result of these unknowns, the personnel may need to make spur of the moment decisions during and after entry, which can lead to dangerous, and potentially fatal, errors in judgment. Further, to enter a structure, the personnel often leave the safe confines of a location, for example an armored vehicle, thereby exposing themselves to potential danger prior to entry.

The use of unmanned vehicles for performing control, surveillance, reconnaissance, communications, and other tasks is known. These include ground based remote-controlled wheeled or tracked vehicles, and aerial vehicles including the Honeywell Micro Air Vehicle, the Honeywell Kestrel, and the Allied Aerospace iSTAR.

Many prior unmanned vehicles are powered by combustion engines, making the vehicles noisy even with sounds mufflers in place. In addition, the use of an engine(s) and the need to carry the requisite fuel supply increases the weight of the vehicle, thereby decreasing the portability of the vehicle, especially by humans.

SUMMARY

An unmanned aerial vehicle having counterrotating ducted rotors that are driven by electric motors. The vehicle has a low weight and a small profile. The unmanned aerial vehicle is suitable for a number of different tasks, including control, surveillance and reconnaissance, communication, and other tasks without exposing personnel to dangerous situations. The vehicle is particularly suited for entering buildings and other enclosed structures and spaces such as caves. The unmanned aerial vehicle can also be equipped for potential offensive actions.

The vehicle is controlled remotely by an operator using a suitable controller, such as a lap top computer or a personal data device. In addition, the vehicle can send information back to the controller relating to the task being performed.

The vehicle is configured as a modular system, which enhances portability by humans and allows repair and refit of the vehicle tailored for a particular application. The size and weight of the vehicle are such as to further increase portability. In addition, the vehicle is configured to perform in environments where magnetometers, GPS and digital compasses are degraded.

In one embodiment, the unmanned aerial vehicle includes a shroud that is concentric about an axis, with the shroud having an interior space. A hub is disposed on the axis, with a first bladed rotor being rotatably mounted on the hub within the shroud for rotation in a first direction about an axis of rotation concentric with the axis of the shroud, and a second bladed rotor being rotatably mounted on the hub within the shroud for rotation in a second direction about an axis of rotation concentric with the axis of the shroud, where the second rotation direction being opposite the first rotation direction. A first electric motor is disposed in the hub and in driving engagement with the first bladed rotor for rotating the first bladed rotor in the first rotation direction, and a second electric motor is disposed in the hub and in driving engagement with the second bladed rotor for rotating the second bladed rotor in the second rotation direction. Further, at least one battery is disposed in the interior space of the shroud providing electrical power to the first and second electric motors.

In another embodiment, the unmanned aerial vehicle includes a shroud that is concentric about an axis, with the shroud including a plurality of shroud sections each of which is separately detachable from the vehicle. A hub is disposed on the axis, with a first bladed rotor being rotatably mounted on the hub within the shroud for rotation in a first direction about an axis of rotation concentric with the axis of the shroud, and a second bladed rotor being rotatably mounted on the hub within the shroud for rotation in a second direction about an axis of rotation concentric with the axis of the shroud, where the second rotation direction being opposite the first rotation direction. A first electric motor is disposed in the hub and in driving engagement with the first bladed rotor for rotating the first bladed rotor in the first rotation direction, and a second electric motor is disposed in the hub and in driving engagement with the second bladed rotor for rotating the second bladed rotor in the second rotation direction. Further, the vehicle includes at least one battery providing electrical power to the first and second electric motors.

DETAILED DESCRIPTION

An unmanned aerial vehicle 10 having counterrotating ducted rotors that are driven by electric motors, with the vehicle having a low weight and a small profile. The unmanned aerial vehicle 10 is suitable for a number of different tasks, including control, surveillance and reconnaissance, communication, and other tasks without exposing personnel to dangerous situations. The vehicle 10 is particularly suited for entering buildings and other enclosed structures and spaces such as caves. The unmanned aerial vehicle can also be equipped for potential offensive actions.

Figure 2:
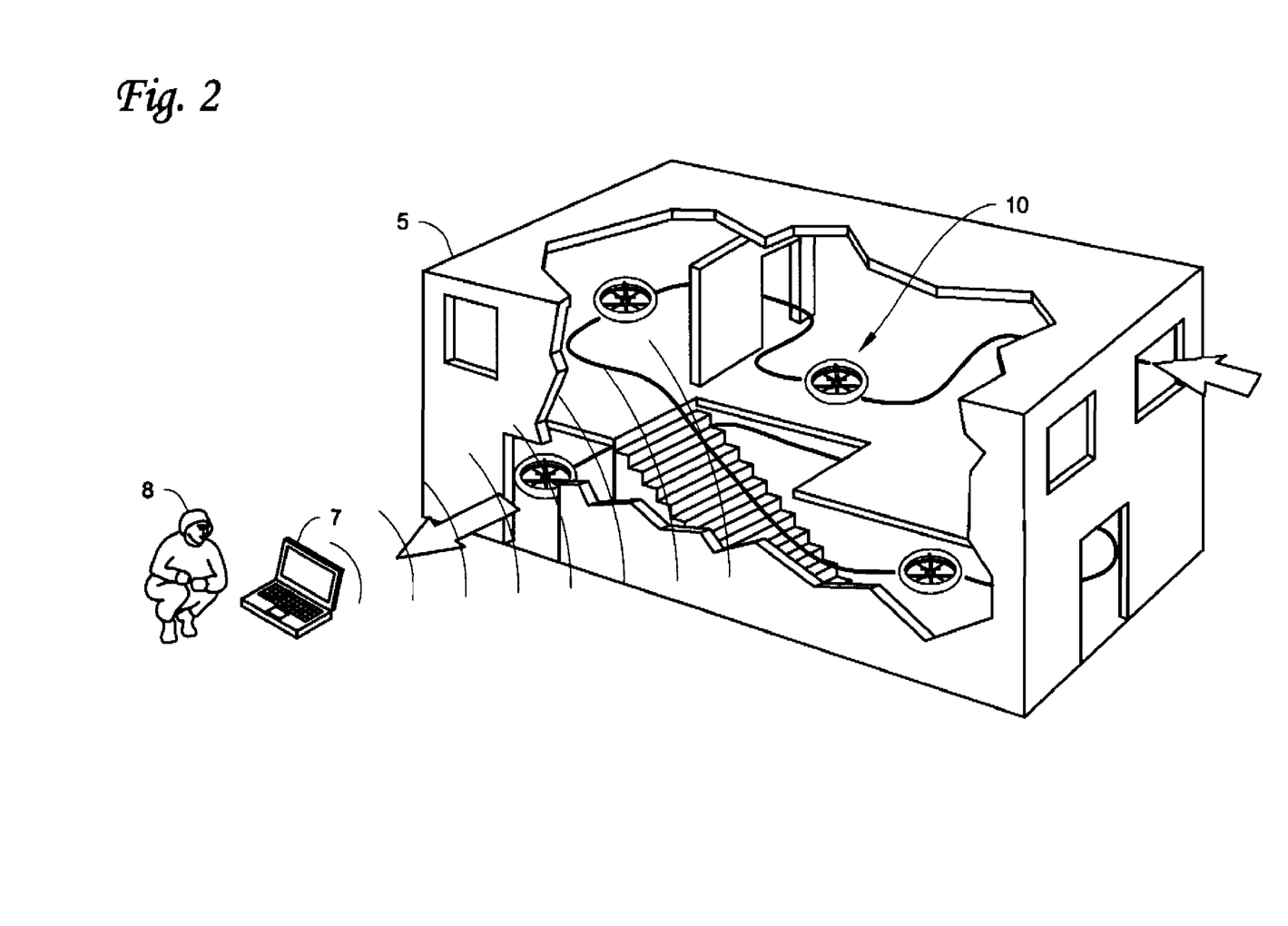
FIG. 2 is a depiction of an exemplary use of the unmanned aerial vehicle.

The vehicle 10 will be further described as being used in a military setting to enter a building 5 and perform reconnaissance therein, as shown in FIG. 2. However, is to be realized that the vehicle 10 can be used in settings other than military, for example law enforcement. In addition, the vehicle can be used enter other man-made and naturally occurring structures, for example caves, and can be used in a manner that does not require entry into a building or other structure, for example open air surveillance and reconnaissance. Further, the vehicle 10 can be used to perform tasks other than reconnaissance, including passive tasks such as control and communications, and aggressive tasks such as offensive action against a building occupant(s).

Figure 1:
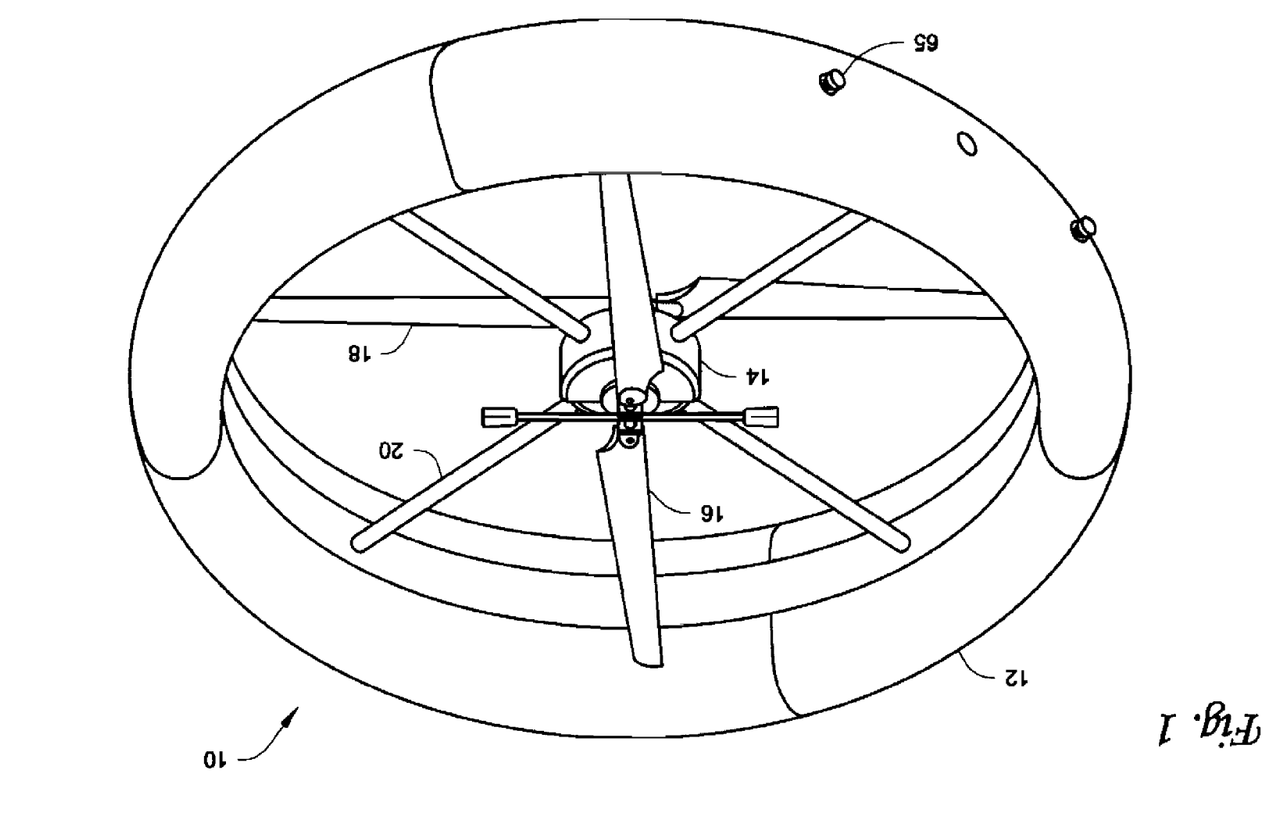
FIG. 1 is a perspective view of the unmanned aerial vehicle.

Turning now to FIG. 1, the unmanned aerial vehicle 10 includes a non-rotating shroud 12 that is concentric about an axis A (see FIGS. 3 and 4), a non-rotating hub 14 that is disposed on the axis A, first and second bladed rotors 16, 18, and a non-rotating frame 20 that connects the shroud 12 to the hub 14.

Figure 3:
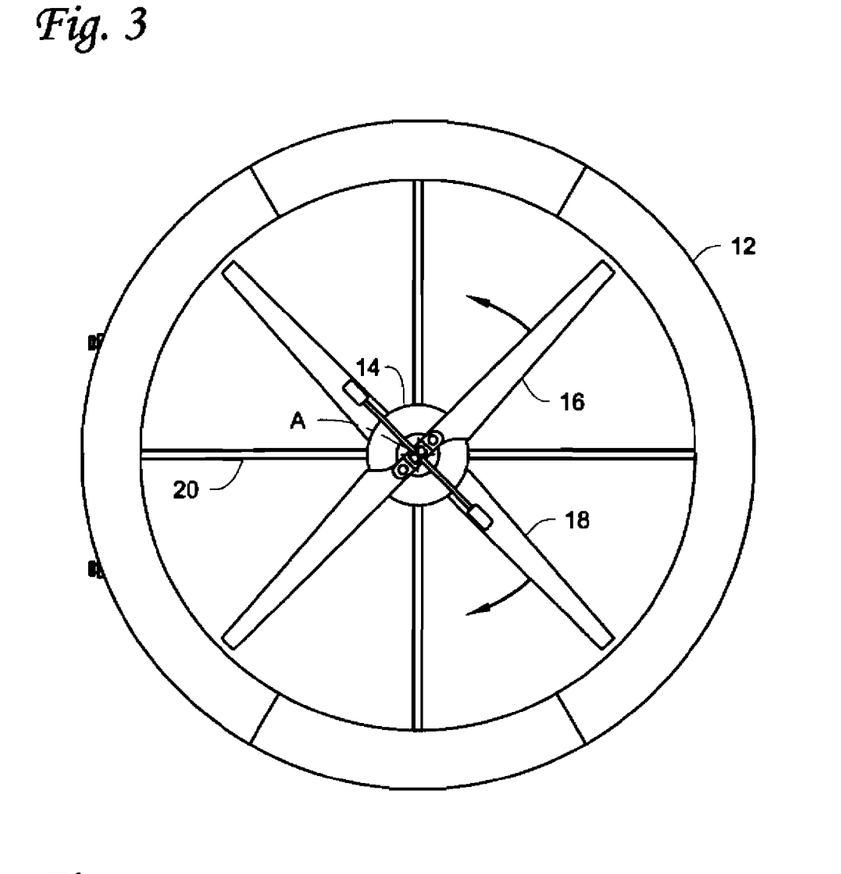
FIG. 3 is a top plan view of the unmanned aerial vehicle.
Figure 4:
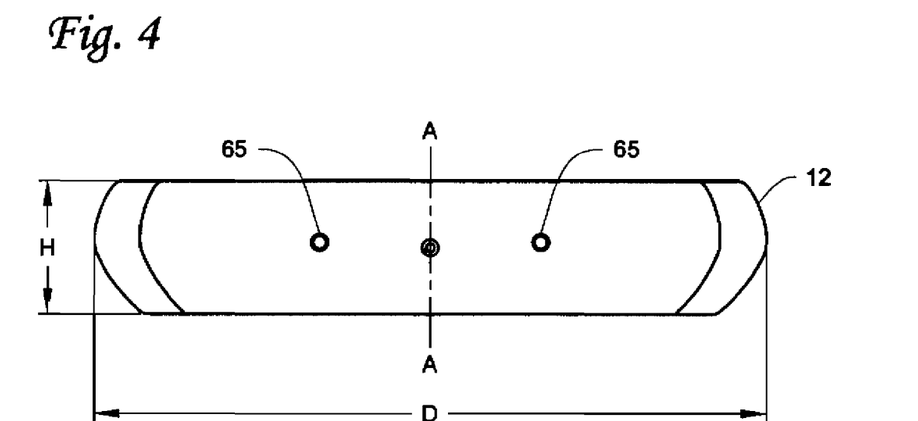
FIG. 4 is a side view of the unmanned aerial vehicle.

With reference to FIGS. 3 and 4, the vehicle 10 is generally circular in configuration, having a relatively small profile with a maximum height H and maximum diameter D chosen to facilitate maneuverability within the building 5. For example, the vehicle 10 can have a maximum height of about 5.0 inches and a maximum diameter of about 22.0 inches. In addition, the vehicle 10 has a low weight to increase portability of the vehicle 10, particularly by humans. For example, the vehicle 10 preferably has a weight of less than about 5 pounds, more preferably a weight of about 3 pounds or less.

With reference to FIGS. 3, 5A, 5B and 6, the first and second rotors 16, 18 counterrotate within and relative to the shroud 12 so that the rotation direction of the first rotor 16 is opposite to the rotation direction of the second rotor 18. The first rotor 16 is mounted at the top of the hub 14 and the second rotor 18 is mounted at the bottom of the hub 14 so that the first rotor 16 is the upper or top rotor while the second rotor 18 is the lower or bottom rotor. In the illustrated embodiment, the distance between the rotors 16, 18 is about 25% of the radius of the first or second rotors 16, 18, with both rotors being surrounded by the shroud 12.

Figure 5A:
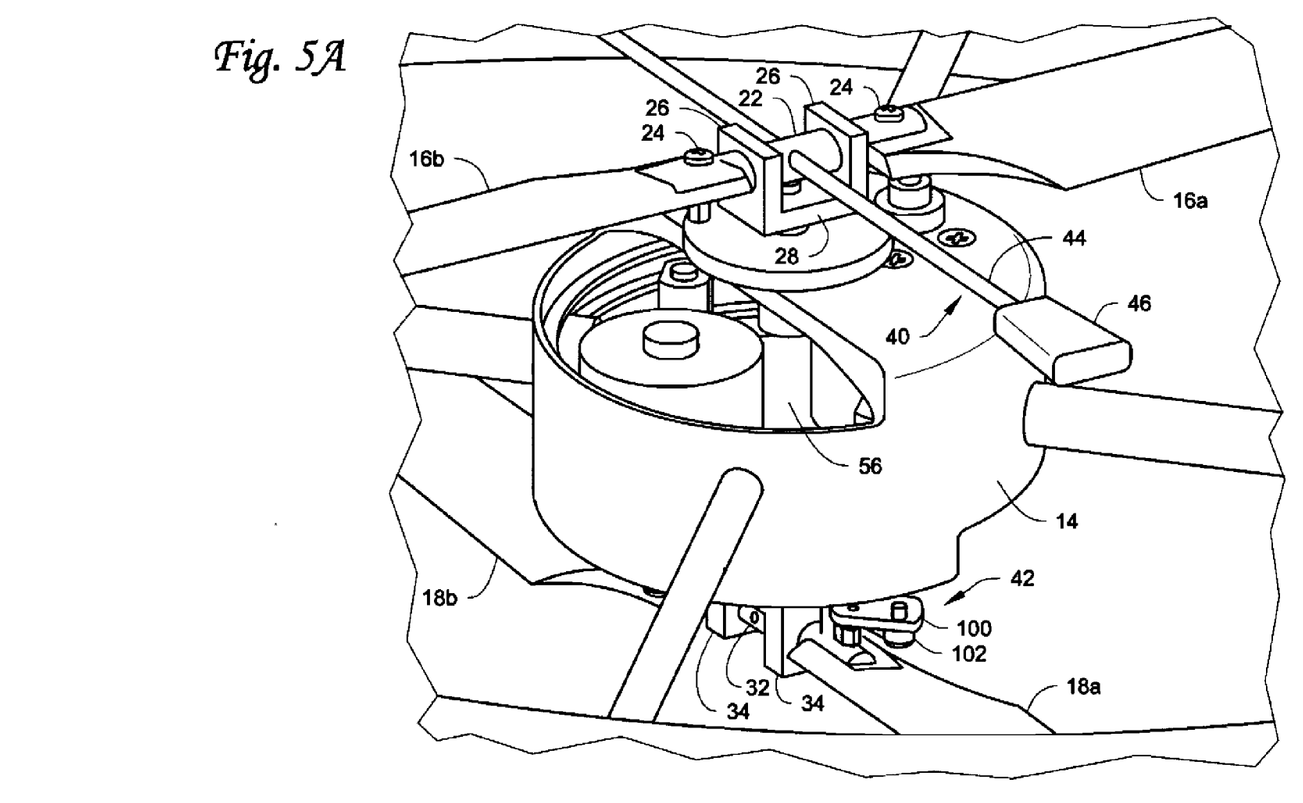
FIG. 5A is a close-up view of the hub of the unmanned aerial vehicle illustrating details of the passive control system for the upper bladed rotor.
Figure 6:
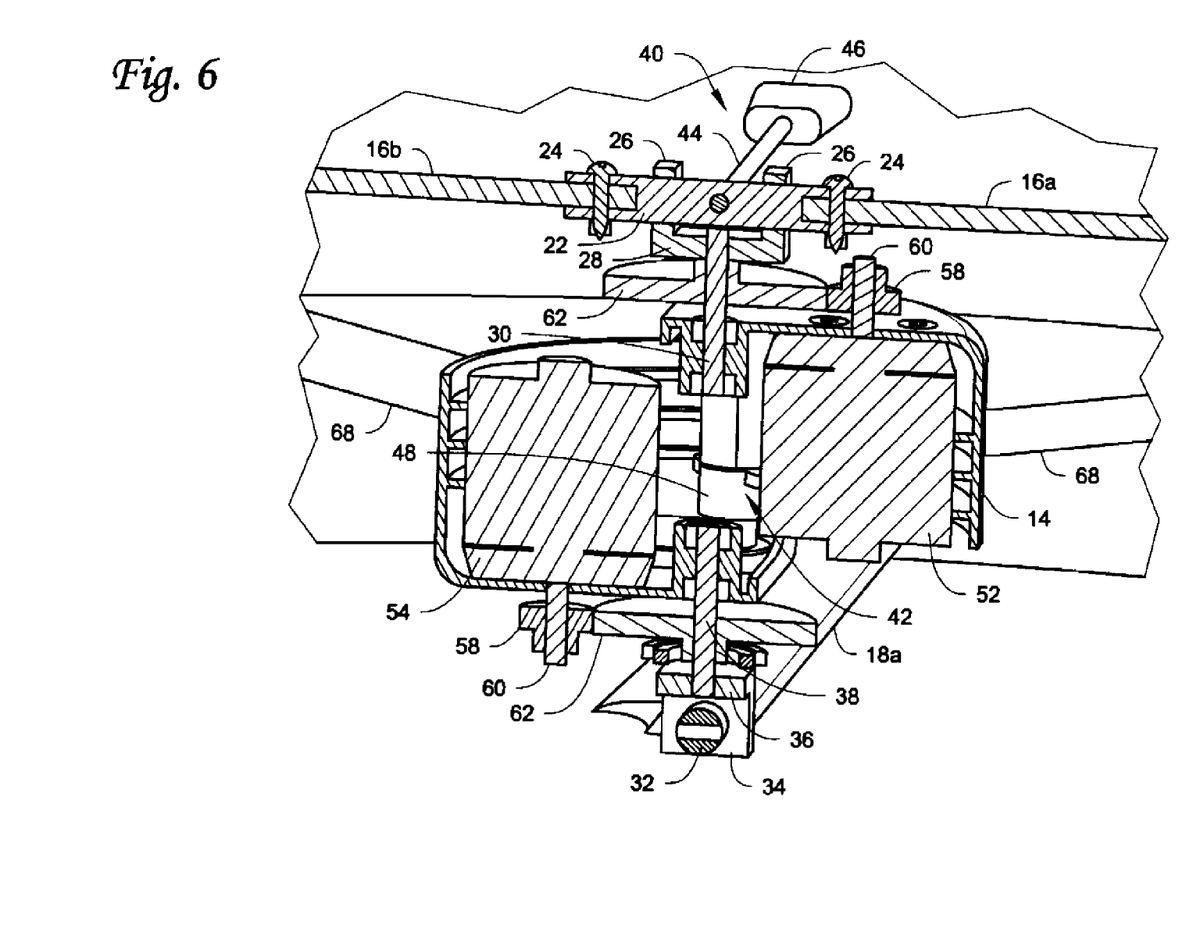
FIG. 6 is a cross-sectional view through the hub to illustrate details of the drive mechanisms for rotating the bladed rotors.

The first rotor 16 includes first and second blades 16a, 16b connected by a rod 22. As shown in FIGS. 5A and 6, each end of the rod 22 is in the shape of a clevis, with the root ends of the blades 16a, 16b being received in the respective clevis and secured to the rod 22 by bolts 24. The rod 22 is rotatably mounted on a pair of flanges 26 that are integral with a base plate 28, to allow rotation of the rod 22 and thus change in the blade angle of the blades 16a, 16b. The base plate 28 is fixed to a drive shaft 30 that is in driving engagement with a drive mechanism for rotatably driving the first bladed rotor 16. The drive shaft 30 is rotatably supported on the hub 14 by bearings.

Figure 5B:
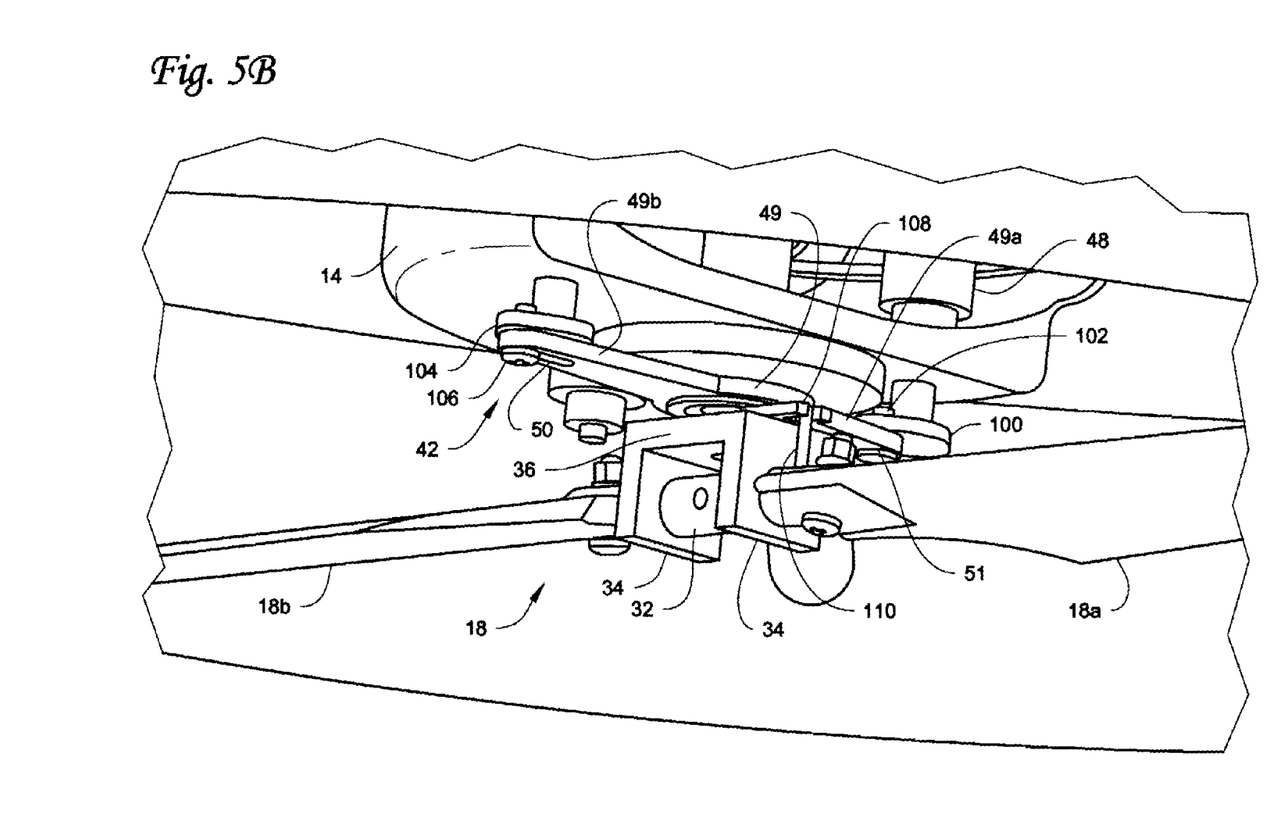
FIG. 5B is a close-up view of the hub illustrating details of the active control system of the lower bladed rotor.

Likewise, as shown in FIGS. 5B and 6, the second rotor 18 includes first and second blades 18a, 18b. The blade 18a is connected to the blade 18b by a rod 32 that extends through flanges 34 that are integral with a base plate 36. The rod 32 is rotatably supported by the flanges 34 to allow rotation of the blades 18a, 18b to change the blade angle of the blades 18a, 18b. The base plate 36 is fixed to a drive shaft 38 that is in driving engagement with a drive mechanism for rotatably driving the first bladed rotor 16. The drive shaft 38 is rotatably supported on the hub 14 by bearings.

A passive control system 40 is connected to the first rotor 16 for controlling the plane of rotation of the first bladed rotor by changing the blade angles of the blades 16a, 16b. With reference to FIGS. 5A and 6, the passive control system 40 includes a weighted fly bar that includes a shaft 44 that is fixed to and extends through the rod 22, and weights 46, each having the same weight, at each end of the shaft 44.

Figure 5C:
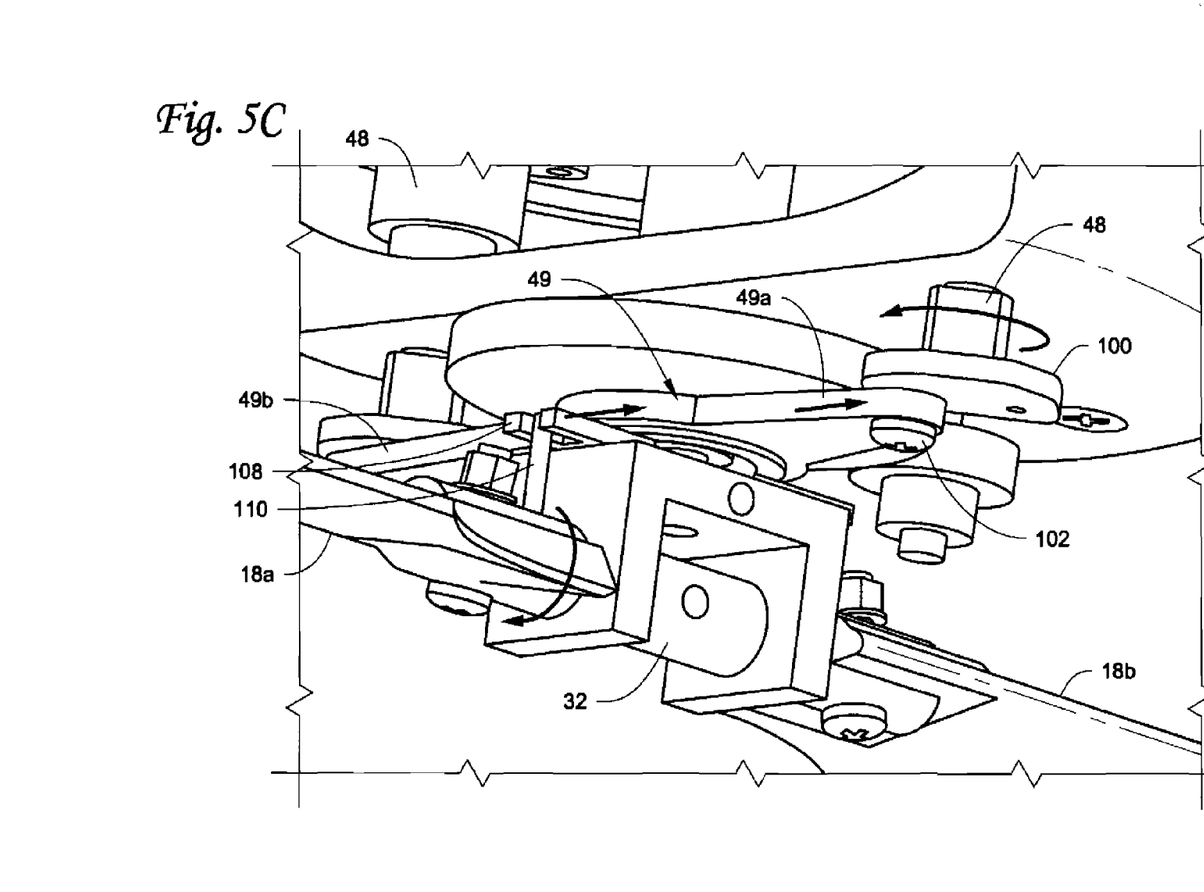
FIG. 5C illustrates control of the blade angle of the lower bladed rotor.

In addition, an active control system 42 is connected to the second rotor 18 for controlling the plane of rotation of the second bladed rotor by changing the blade angles of the blades 18a, 18b. With reference to FIGS. 5B, 5C and 6, the active control system 42 includes a pair of servos 48 (only one servo is shown in FIG. 6) disposed within the hub 14. A plate 49 having a pair of arms 49a, 49b is mounted under the housing of the hub 14 so as to be slideable in a direction perpendicular to the rotation axis of the rotor 18 as shown by the arrow in FIG. 5C. A slot 50 is formed in the end of the arm 49b, while a hole 51 is formed in the arm 49a. One servo 48 is linked to the arm 49a by a link 100 having an offset pin 102 disposed in the hole 51. The other servo 48 is linked to the arm 49b by a link 104 having an offset pin 106 disposed in the slot 50. A clevis 108 is connected to the plate 49 and at a generally right angle thereto so as to move with the plate. A pin 110 extends upwardly from the rod 32, with the end of the pin 110 disposed between the arms of the clevis 108.

As shown in FIG. 5C, rotation of either servo 48 causes rotation of the respective link 100, 104, thereby actuating the offset pin 102, 106. Since the pins 102, 106 are offset from the axis of rotation of the servos 48, the plate 49 will be forced to move in a direction perpendicular to the rotation axis of the rotor 18. This causes the clevis 108 to move in the same direction, which actuates the pin 110 causing the rod 32 to rotate thereby changing the angle of the blades 18a, 18b.

In view of the symmetrical rotors 16, 18, active control of only one rotor is required for translational flight along any axis. The servos 48 and plate 49 allow active control of the blade angles of the blades 18a, 18b to achieve translational flight of the vehicle 10. In contrast, the weighted fly bar is directly connected to the blades 16a, 16b for automatically and equally changing the blade angles of the blades 16a, 16b. As a result of the direct connection between the weighted fly bar and the rotor 16, under normal operating conditions, the weighted fly bar tends to return the vehicle 10 to a steady state hovering condition.

The hub 14 rotatably supports the rotors 16, 18, and has a generally hollow interior in which electric motors 52, 54 for driving the rotors 16, 18 are disposed. The hub 14 can be made of a material providing good tensile strength and low weight, for example, carbon fiber polyamide composite. The electric motors 52, 54 are, for example, 65 W motors.

As shown in FIG. 5A, the hub 14 includes an opening 56 at the top thereof to provide access for installation and maintenance, and to provide an airflow path to allow cooling of the motors 52, 54. If necessary, a filter (not shown) can be installed over the opening 56 to filter out sand and dust from the air.

The motors 52, 54 are in driving engagement with the rotors 16, 18 through respective suitable drive mechanisms. In the illustrated embodiment, each drive mechanism includes a drive gear 58 connected to the output shaft 60 of the motor 52, 54, and a driven gear 62 that is connected to the respective drive shaft 30, 38. However, other drive mechanisms could be used to connect the motors 52, 54 to the rotors 16, 18, for example a belt drive mechanism.

Figure 7:
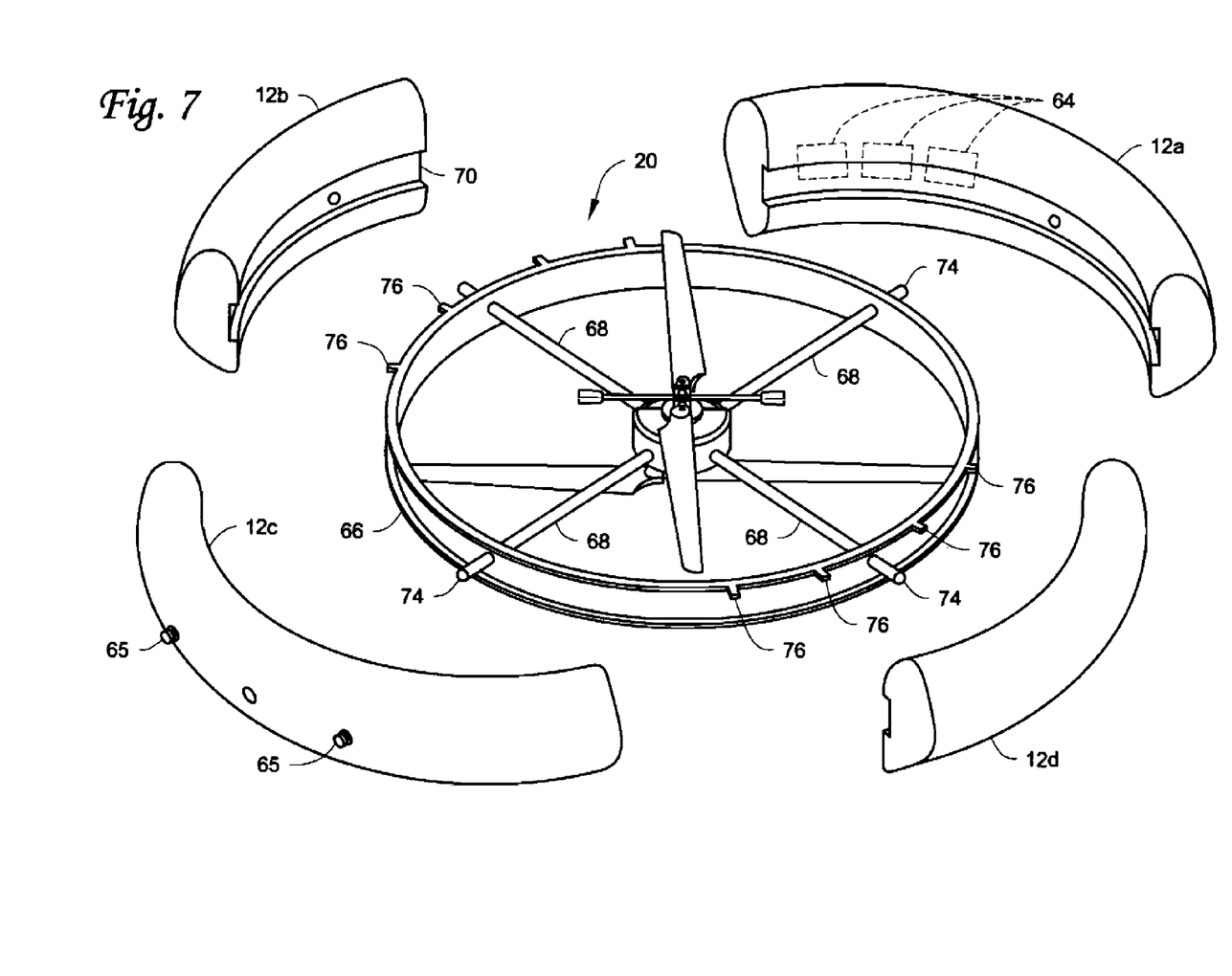
FIG. 7 illustrates the shroud sections forming the shroud of the unmanned aerial vehicle.

Turning now to FIG. 7, the shroud 12 is formed of a plurality of shroud sections 12a, 12b, 12c, 12d that are detachably connected to the vehicle 10. In the illustrated embodiment, four shroud sections are used. However, a larger or smaller number of shroud sections can be used. In addition, the shroud sections 12a-d in the illustrated embodiment are not of the same circumferential size as a result of the different functions of each section. The shroud sections could be made to have the same circumferential size if desired. Regardless of whether the shroud sections are of the same circumferential size or not, the shroud sections should combine to form a 360 degree circle.

Each shroud section 12a-d forms a module that contains elements used in the operation of the vehicle 10. For example, section 12a can house one or more batteries 64, for example lithium-based batteries, such as lithium sulphur batteries, or other comparable power supply, for providing power to the motors 52, 54. Section 12b can house control equipment, for example various processors and electronics, used to control vehicle 10 flight and operations, including control of other shroud modules. Section 12c can house a suitable payload specific to the intended use or application of the vehicle 10. For example, the section 12c can house passive equipment such as one or more cameras 65, an infrared illuminator, a microphone, and sensors, or offensive equipment such as weapons. Section 12d can house communications equipment for enabling communications with a suitable controller 7, such as a lap top computer or a personal data device (see FIG. 2).

Preferably, the shroud 12 contains one or more optic flow sensors. The optic flow sensors are used along with an inertial measurement unit for navigation of the vehicle 10 and to help the vehicle 10 avoid collisions with objects within the building. In an exemplary embodiment, there is at least one optic flow sensor in each of the shroud sections 12b, 12c, 12d. The use of optical flow sensors allows the vehicle to operate without using guidance systems such as GPS. As a result, the vehicle can be used in environments that are not suitable for GPS and other sensors or where the performance of GPS and other guidance systems are degraded, such as in caves.

Each shroud section 12a-d is made from durable, lightweight materials. For example, each shroud section 12a-d can be made from ARCEL® foam, a carbon fiber composite or combinations thereof. When made of ARCEL® foam, each shroud section 12a-d can have a weight of about 53 grams before the addition of additional components. The total weight of the shroud sections 12a-d with additional internal components can be, for example, approximately 2 pounds.

The shroud sections 12a-d are designed to be non-destructively detachably connected to the frame 20 to allow disassembly of the vehicle to increase portability, and to allow individual sections 12a-d to be removed and replaced with other sections or for repair. Since the shroud sections 12a-d are replaceable, the vehicle 10 can be tailored to differing uses and applications by replacing the shroud sections with sections suitable for the intended use of the vehicle. The detachable connection between the shroud sections and the frame 20 is preferably achieved using a non-destructive mechanical and electrical connection that permits removal of the sections without destroying or damaging the shroud sections or the frame.

The frame 20 is used to connect the shroud 12 to the hub 14. The frame 20 is designed to be stiff, have a low weight, and minimize the effect on the airflow through the vehicle 10. In the illustrated embodiment, the frame 20 includes a ring 66 that is concentric to the axis A, and rods 68 that are integral with the ring 66 and connect to the hub 14, as shown in FIGS. 1, 3 and 7. The ring 66 and rods 68 can be made of, for example, a composite material, such as a carbon fiber composite. In addition, the rods 68 are preferably hollow tubes to reduce weight and act as conduits for wires passing from the shroud sections 12a-d to the hub 14. The rods 68 are preferably integrally formed with the ring 66 and the hub 14. However, the rods 68 could be detachably connected to both the ring 66 and the hub 14 to allow replacement of the rods in the event of damage to the rods.

Figure 8:
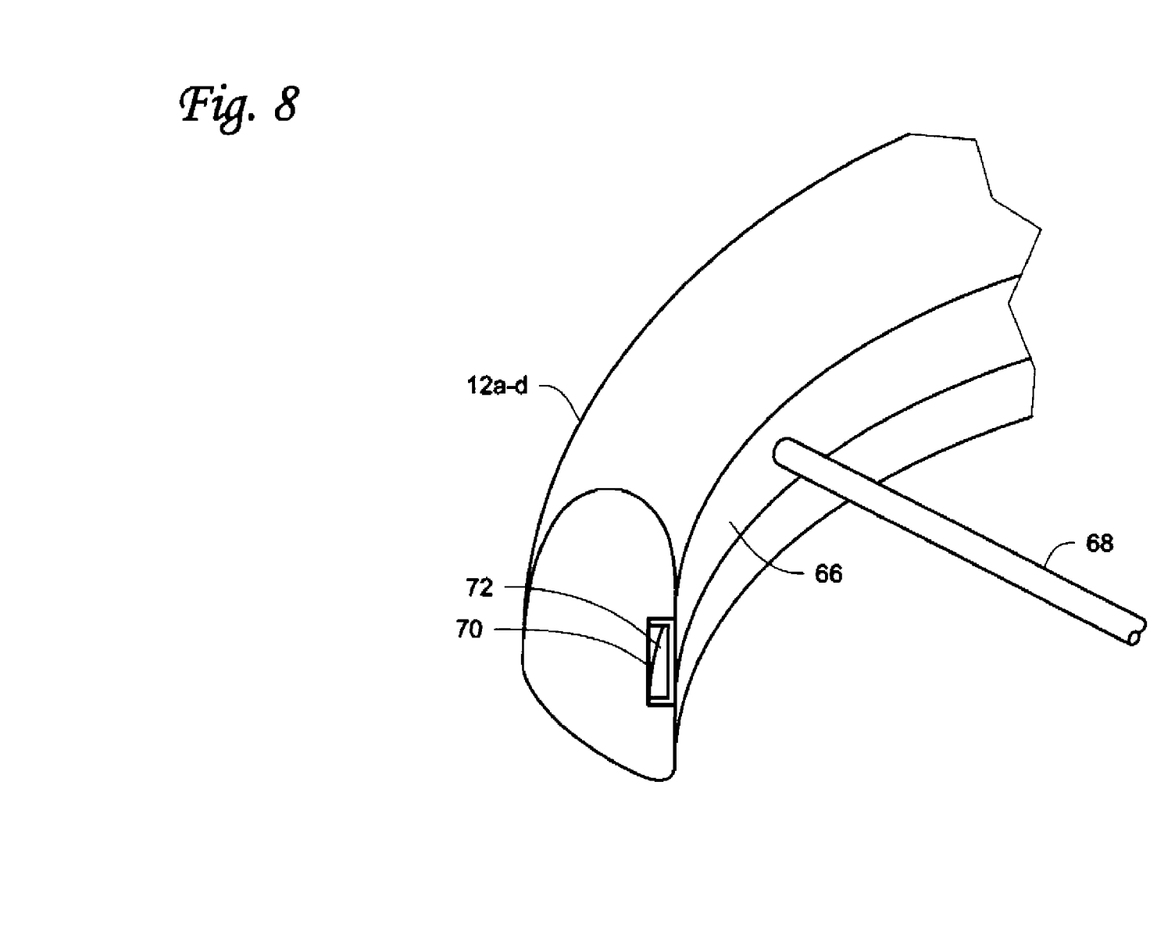
FIG. 8 is a close-up view of a portion of a shroud section connected to a ring.

As shown in FIG. 8, the ring 66 is generally C-shaped in cross-section with the "C" facing outward. In addition, each shroud section 12a-d includes a channel 70 defined on the inner face thereof that receives the ring 66 therein. When the ring 66 is received within the channel 70 of a respective shroud section, the inner surface of the ring is flush with the inner face of the shroud section, and a gap 72 is formed between the base of the "C" of the ring and the shroud section (see FIG. 8). The gap 72 provides space for routing wiring and the like.

Returning to FIG. 7, the ends 74 of the rods 68 extend past the ring 66. In addition, a plurality of tabs 76 extend from the ring 66. In the illustrated embodiment, there are two tabs 76 between each projecting end 74 so that two tabs 76 and a projecting end 74 are associated with each shroud section 12a-d. The projecting end 74 and the tabs 76 engage with suitable apertures 78 formed in the shroud sections.

Figure 9:
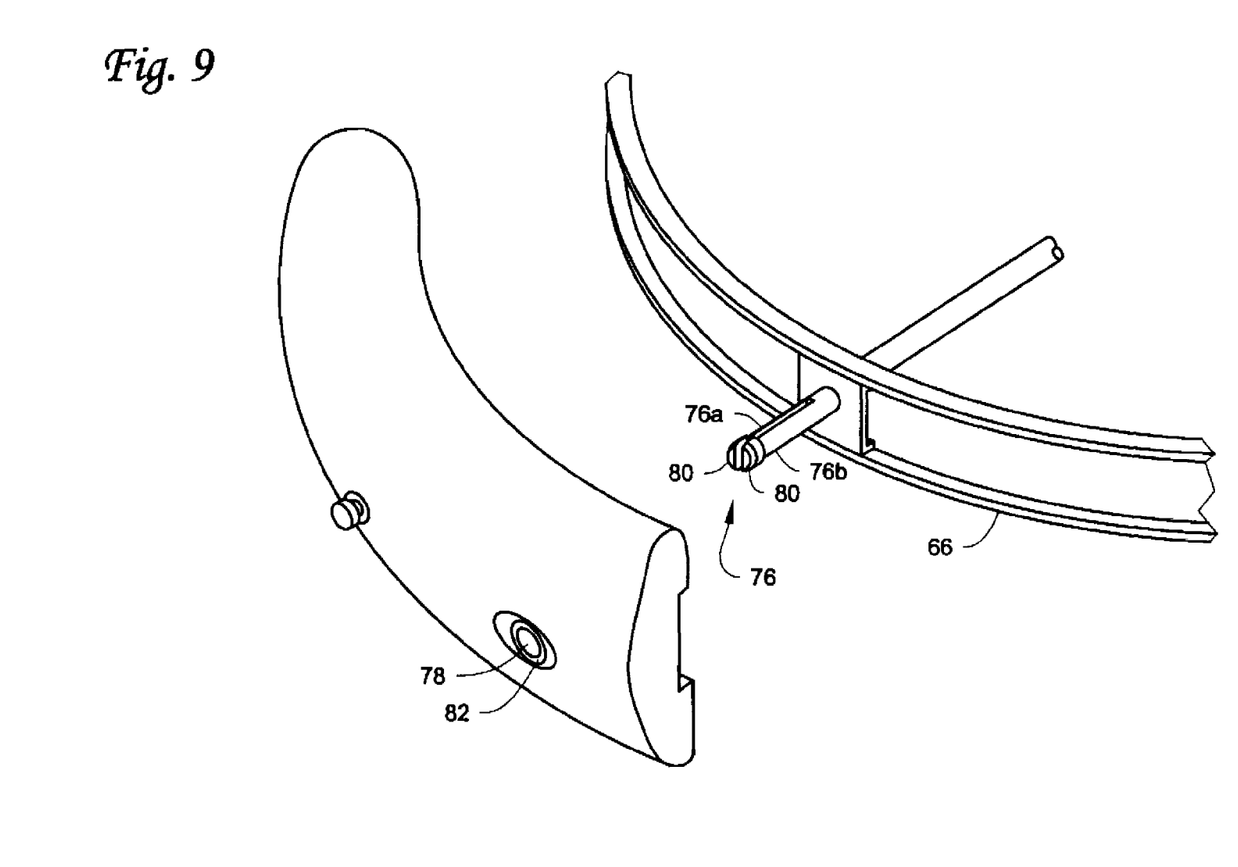
FIG. 9 details the non-destructive, detachable connection between the shroud sections and the ring.

Details of the connection between the shroud sections and the ring 66 are shown in FIG. 9. The end of the tab 76 is bifurcated into two arms 76a, 76b that can flex toward each other. The tip of each arm 76a, 76b is provided with an enlarged shoulder 80. When the tab 76 is pushed into the aperture 78, the arms 76a, 76b flex toward each other slightly, until the shoulders 80 project from the aperture 78 at which point the shoulders 80 snap in place to lock on to the surface 82 surrounding the aperture 78. The projecting ends 74 are configured and function in the identical manner. This "snap-fit" connection between the ring 66 and the shroud section permits disconnection of the shroud section by squeezing the arms 76a, 76b toward each other to disengage the shoulders 80 from the surface 82 and thereby permitting removal of the shroud section.

With reference to FIG. 2, the vehicle 10 is operated remotely by an operator 8, for example a soldier, using the controller 7. To enter the building 5 and perform reconnaissance therein, the vehicle 10 is flown by the operator 8 through a suitable access point, such as through an open door or an open window. The cameras 65 on the vehicle 10 send back a video of the interior of the building 5 to the operator 8. The operator 8 can fly the vehicle 10 throughout accessible portions of the interior of the building to allow the entire building to be scouted. As a result, the operator 8 can determine whether the building is occupied, how many occupants there are, and where in the building the occupants are located. In addition, the operator 8 can search for weapons, explosive devices, and other potential dangers prior to entering the building 5.

Other configurations and uses of the unmanned aerial vehicle are possible utilizing the above described concepts.

The invention claimed is:

1. An unmanned aerial vehicle, comprising:
    a shroud that is concentric about an axis, the shroud having an interior space;
    a hub disposed on the axis;
    a first bladed rotor rotatably mounted on the hub within the shroud for rotation in a first direction about an axis of rotation concentric with the axis of the shroud;
    a second bladed rotor rotatably mounted on the hub within the shroud for rotation in a second direction about an axis of rotation concentric with the axis of the shroud, the second rotation direction being opposite the first rotation direction;
    a first electric motor disposed in the hub and in driving engagement with the first bladed rotor for rotating the first bladed rotor in the first rotation direction;
    a second electric motor disposed in the hub and in driving engagement with the second bladed rotor for rotating the second bladed rotor in the second rotation direction;
    the first electric motor and the second electric motor are disposed between the first bladed rotor and the second bladed rotor, the first and second electric motors are arranged relative to each other such that in side view the first and second electric motors overlap each other in the vertical direction, and the first and second electric motors are disposed on opposite sides of the shroud axis; and
    at least one battery disposed in the interior space of the shroud providing electrical power to the first and second electric motors.

2. The unmanned aerial vehicle according to claim 1, wherein the shroud has a diameter of approximately 22 inches or less, a height of about 5 inches, and a vehicle weight of less than about 5 pounds.

3. The unmanned aerial vehicle according to claim 1, wherein the shroud includes a plurality of shroud sections each of which is separately and non-destructively detachable from the vehicle.

4. The unmanned aerial vehicle according to claim 3, wherein a first said shroud sections contains the at least one battery, a second said shroud section contains control equipment, a third shroud section contains communications equipment, and a fourth said shroud section contains payload equipment.

5. The unmanned aerial vehicle according to claim 3, further comprising a ring attached to the shroud sections with an inner surface of the ring flush with inner faces of the shroud sections, the ring is concentric to the axis of the shroud, and further comprising rods extending from the ring to the hub.

6. The unmanned aerial vehicle according to claim 1, further comprising a passive control system connected to the first bladed rotor that controls the plane of rotation of the first bladed rotor, and an active control system connected to the second bladed rotor that controls the plane of rotation of the second bladed rotor.

7. The unmanned aerial vehicle according to claim 6, wherein the first bladed rotor comprises first and second blades connected by a rod, and the passive control system comprises a weighted fly bar that extends through the rod transversely to the axis of the rod.

8. The unmanned aerial vehicle according to claim 6, wherein the second bladed rotor comprises first and second blades, and the active control system comprises a first servo motor connected to the first blade and a second servo motor connected to the second blade.

9. The unmanned aerial vehicle according to claim 1, comprising a distance of no more than about 25% of the radius of the bladed rotors between the first and second bladed rotors.

10. The unmanned aerial vehicle according to claim 1, wherein the first and second electric motors each include an output shaft that is parallel to the axis of the shroud, the output shaft of the first electric motor extending toward the first bladed rotor and the output shaft of the second electric motor extending toward the second bladed rotor.

11. An unmanned aerial vehicle, comprising:
    a shroud that is concentric about an axis, the shroud includes a plurality of shroud sections each of which is separately detachable from the vehicle;
    a hub disposed on the axis;
    a first bladed rotor rotatably mounted on the hub within the shroud for rotation in a first direction about an axis of rotation concentric with the axis of the shroud;
    a second bladed rotor rotatably mounted on the hub within the shroud for rotation in a second direction about an axis of rotation concentric with the axis of the shroud, the second rotation direction being opposite the first rotation direction;
    a first electric motor disposed in the hub and in driving engagement with the first bladed rotor for rotating the first bladed rotor in the first rotation direction;
    a second electric motor disposed in the hub and in driving engagement with the second bladed rotor for rotating the second bladed rotor in the second rotation direction;
    the first electric motor and the second electric motor are disposed between the first bladed rotor and the second bladed rotor, the first and second electric motors are arranged relative to each other such that in side view the first and second electric motors overlap each other in the vertical direction, and the first and second electric motors are disposed on opposite sides of the shroud axis; and
    at least one battery providing electrical power to the first and second electric motors.

12. The unmanned aerial vehicle according to claim 11, wherein the shroud has a diameter of approximately 22 inches or less, a height of about 5 inches, and a vehicle weight of less than about 5 pounds.

13. The unmanned aerial vehicle according to claim 11, wherein a first said shroud section contains control equipment, a second said shroud section contains communications equipment, and a third said shroud section contains payload equipment.

14. The unmanned aerial vehicle according to claim 11, further comprising a passive control system connected to the first bladed rotor that controls the plane of rotation of the first bladed rotor, and an active control system connected to the second bladed rotor that controls the plane of rotation of the second bladed rotor.

15. The unmanned aerial vehicle according to claim 14, wherein the first bladed rotor comprises first and second blades connected by a rod, and the passive control system comprises a weighted fly bar that extends through the rod transversely to the axis of the rod.

16. The unmanned aerial vehicle according to claim 14, wherein the second bladed rotor comprises first and second blades connected by a rod, and the active control system comprises a first servo motor connected to the first blade and a second servo motor connected to the second blade.

17. The unmanned aerial vehicle according to claim 11, comprising a distance of no more than about 25% of the radius of the bladed rotors between the first and second bladed rotors.

18. The unmanned aerial vehicle according to claim 11, further comprising a ring attached to the shroud sections with an inner surface of the ring flush with inner faces of the shroud sections, the ring is concentric to the axis of the shroud, and further comprising rods extending from the ring to the hub.

19. The unmanned aerial vehicle according to claim 11, wherein the first and second electric motors each include an output shaft that is parallel to the axis of the shroud, the output shaft of the first electric motor extending toward the first bladed rotor and the output shaft of the second electric motor extending toward the second bladed rotor.

* * * * *